UNITED STATES PATENT OFFICE.

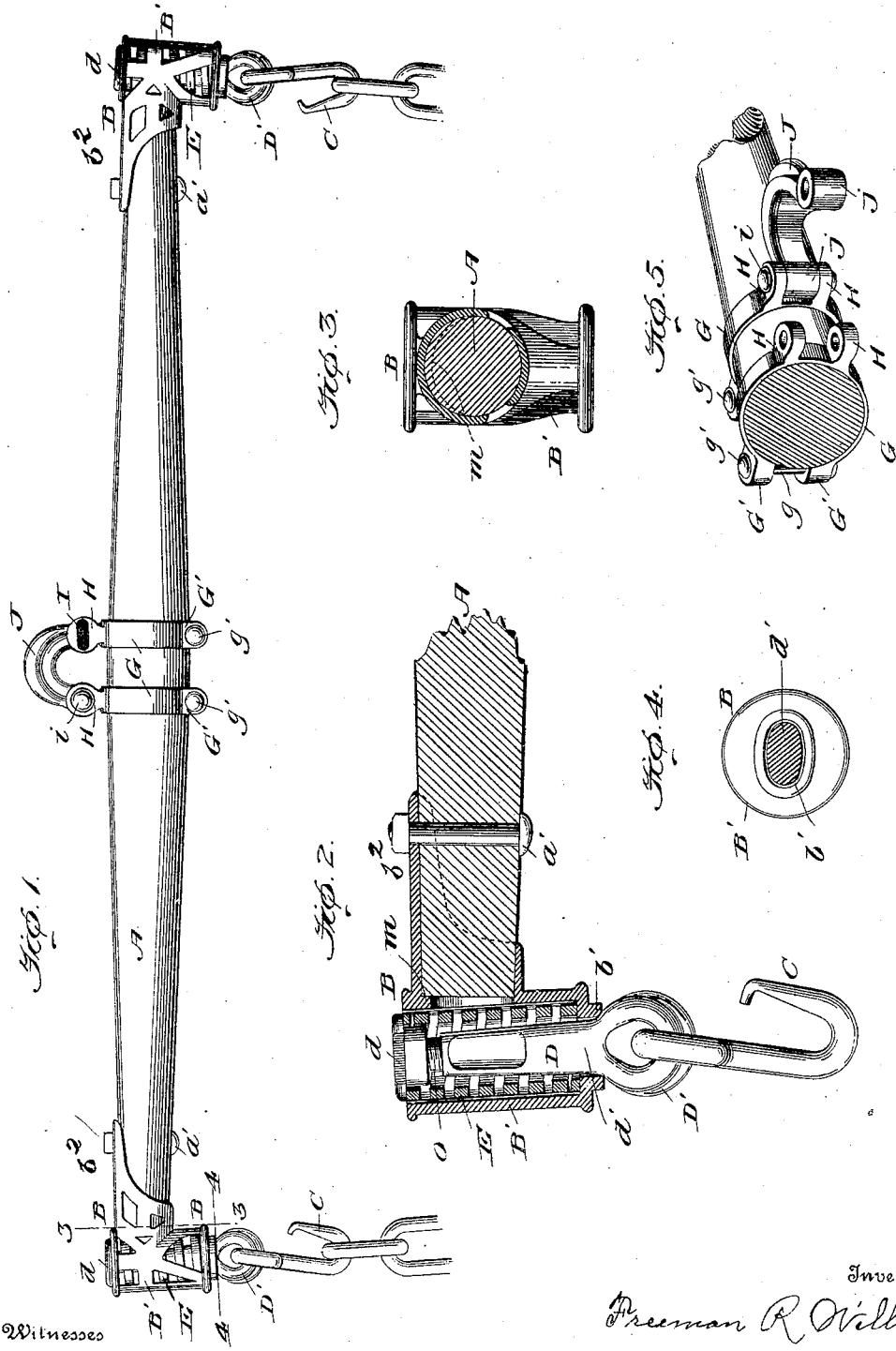

FREEMAN R. WILLSON, OF WORTHINGTON, OHIO.

SPRING-WHIFFLETREE.

932,932.

Specification of Letters Patent.

Patented Aug. 31, 1909.

Application filed March 20, 1909. Serial No. 484,720.

*To all whom it may concern:*

Be it known that I, FREEMAN R. WILLSON, a citizen of the United States, residing at Worthington, in the county of Franklin and State of Ohio, have invented certain new and useful Improvements in Spring-Whiffletrees; and I do hereby declare the following to be a full, clear, and exact description of the invention, such as will enable others skilled in the art to which it appertains to make and use the same.

This invention relates to swingletrees having springs at their ends for the attachment of draft chains or traces, and consists in the construction and combination of parts hereinafter particularly set forth and claimed.

In the accompanying drawings Figure 1 represents a plan view of a whiffletree embodying my invention, showing the draft chain attached thereto, but broken away at the second length. Fig. 2 represents a detail view of one of the end casings and proximate devices, partly in horizontal longitudinal section and partly in plan. Fig. 3 represents a cross section on the line 3—3 of Fig. 1 looking toward the proximate end of the whiffletree. Fig. 4 represents a cross section on the line 4—4, of Fig. 1, looking toward the cylinder B'. Fig. 5 represents a detail perspective view of the clevis in open position and of a part of the whiffletree.

A designates the wooden body of the swingletree, tapering as usual from the middle to the ends, which are preferably elliptical in cross section.

B designates each of the two end casings, consisting of cast metal open work, and fitted on the ends of body A. Each of these casings has an integral arm $b^2$ extending along the back of said body and fastened thereto by a bolt $a'$ extending through the latter or in any convenient way. Each of these casings has a cylindrical, integral, open work socket B', arranged at the end of whiffletree body A, and transversely thereto, but at an angle approximately corresponding to that of the draft chains or traces, Fig. 1, when these are hitched up and pulled upon by the horse in normal use. These chains connect detachably with hooks C, which are hung from eyes D' of draw bars D, having at their rear ends heads or disks $d$, adapted to be longitudinally drawn into the interior of cylindrical spring socket B', although its normal position is at or slightly beyond the rear end of this socket, which end is preferably approximately flush, as shown with the bar $b^2$ and rear face of the tubular lateral part or socket of said casing, fitting on the body A. A spring E of helical form, and considerable strength is fitted into socket B', between said head of draw bar and the forward end of this socket, said end being closed excepting an elliptical opening, $b'$, which fits a flattened part, $d'$ of draw bar D, which bar is similarly elliptical in cross section, and of proper size to slide readily through said opening, though it cannot turn therein. This ability of said draw bar to slide longitudinally but not to turn, is the requirement which determines the form of said bar and said opening, the particular form shown being only by way of instance and illustration, and any other form answering equally well if said condition be fulfilled. This construction protects the draw bar casing and spring against injury by twisting and straining, it prevents said bar from turning within the casing and rattling around therein, and secures very much greater efficiency and durability. It is best that the means for preventing the turning of the bar should be located at the front of the casing, because the same will operate there to much better advantage than at any other point, and will not interfere with the action of the spring.

The arrangement of the draw bars in line with the pull of the chains, which is caused by the inclined position of the casings, hereinbefore explained, very greatly reduces friction and strain, and permits the horse to apply his strength to the best advantage in pulling on the whiffletree through said draw bars, springs, and casings. Heretofore when end casings have been used for whiffletrees to inclose springs connected with the draft chains or traces, or acted on through draw bars by the pull on the same, the spring-holding sockets in said casings have been at right angles with the body of the whiffletree, necessitating an injurious strain on the draw bar and other points at or near the front of the casing, and making it impracticable to safely and satisfactorily use means for guiding the draw bar, and preventing it from turning, such as I have employed. The advantage of having the end of socket B' flush with the rear part of the remainder of the casing is that it will prevent needless contact with the doubletree, and keep this rear end of the socket out of the way of all parts, devices and persons, thus lessening the risk that it may become injured and also increasing convenience. Each end casing is provided internally with stop m, preferably arranged at the junction of the two sockets constituting said casing and consisting of a lug or flange on the forward edge of the opening which connects said sockets. The function of this stop is to prevent the end of the body A from being thrust too far into the socket B′, which would cause it to bear against the spring E and impede the same. Each end casing, and the parts inclosed therein, and coöperating therewith have the same construction as the corresponding elements at the other end of the swingletree.

G designates a pair of lateral rings arranged at an interval in parallel planes on swingletree body A on opposite sides in the middle point thereof to afford a secure double grip or bearing for the clevis which engages a suitable attachment of the doubletree, plow beam or other part to which draft is to be applied; of which clevis these rings form important parts. Each ring G is divided at the front side to form an opening $g$, on each side of which is a perforated lug G′ receiving a transverse rivet $g'$ which is securely headed after being passed through said lugs to draw said ring on the body A tightly enough for absolute security. At the rear side of the swingletree each ring G is provided with another pair of perforated lugs H, receiving between them terminal eyes $j$, of a U-shaped clevis hook J, the curved middle part of which is presented rearward in the line of draft. A pintle $i$, which is preferably riveted, passes through one of the eyes $j$ and the corresponding pair of lugs H. The other eye $j$ of said clevis hook is detachably held while in use in position between the other pair of lugs H of the other ring G by means of a removable split pin or key I, or any convenient equivalent detachable fastening. While this fastening is in position it holds said hook ready for the draft, completing and closing the clevis, as shown in Fig. 1. When said split pin or other fastening is withdrawn, said hook turns back on its pivot under the slightest pull into the position shown in Fig. 5, and the clevis is then open, freeing said whiffletree from the doubletree or any other device or parts to which it may be attached. This clevis as a whole is very simple, durable and strong, and easily closed and opened. Its two rings are readily interchangeable, its hook J is easily turned end for end, and there are no other parts except the split pin and the rivet.

The end casings already described are very light by reason of their open-work structure and the elimination of as much of their material as is possible. This is especially noticeable in the reduction of the socket which fits on the end of the wooden body A to a mere bar at the rear of said body, and the very great restriction of said socket in front near the socket B′ which holds the spring; also in the entire removal of material of said casing opposite the end of said body A where the two sockets constituting said casing come together, excepting only the stop m of each casing before referred to.

All of these special features of the metallic fittings of the swingletree tending to lightness of course remedy wholly or in great part the chief objection which has hitherto been found to spring whiffletrees, namely their increased weight due to their additional metallic parts. Said fittings are preferably of cast metal, excepting only the rivets, bolt and split pin aforesaid, and the spring C.

It is important to provide for conveniently removing the spring C and draw bar D from each casing. To this end the disk or head $d$ is internally screw-threaded, making it a nut which engages screw-threads O on a reduced cylindrical part of draw bar D at the rear end of the latter. These screw threads are strong enough to hold said nut or head securely in place against the rearward pressure of said spring, but when said head is unscrewed, the said head is easily withdrawn through the rear end of socket B′ and the draw bar through the forward end of said socket.

It would of course be practicable to use most of the foregoing devices on a doubletree, instead of a swingletree, but practically they are found very much more efficacious on the latter.

The points of split, or divisions of the two split rings G are distinct from the points of attachment of the clevis hook J, and on the opposite sides of the rings from the latter; said rings may be tightened as often as the wood of the whiffletree body A shrinks, to compensate for such shrinkage, a sufficient space being left for this purpose between their proximate ends; and in thus tightening there is no need of disturbing the clevis hook, or loosening it if fastened or closed, as would be the case if the lugs or other parts of the ring to which said clevis hook is attached, were identical in location with the lugs by which the said rings are clamped or tightened or with the points of division of said rings.

Having thus described my invention, what I claim as new and desire to secure by Letters Patent is,

1. In combination with a swingletree body, a pair of springs at the ends thereof and casings holding said springs in a fixed position inclined slightly toward each other, said springs being provided with means for applying the draft of an animal thereto.

2. In combination with a swingletree body, a pair of springs at the ends thereof and means for holding said springs to said body, and fixed in a position inclined slightly forward toward each other, said springs being provided with means for applying the draft of an animal thereto.

3. In combination with a swingletree body, a pair of springs at the ends thereof, means for holding said springs to said body and in a fixed position inclined slightly forward toward each other, draft bars and draft chains, said chains being attached to said draft bars, substantially as set forth.

4. In combination with a swingletree body, a pair of springs at the ends thereof and openwork casings holding said springs in a fixed position, inclined slightly forward toward each other, said springs being provided with means for applying the draft of an animal thereto.

5. In combination with a whiffletree body, a pair of end casings, each of which consists of two sockets, springs located in said casings and means for applying to said springs the pull of a pair of draft chains, said casings being so formed that one socket fits upon the end of the body of said whiffletree and the other socket holding the spring, is presented forwardly in a slightly inwardly inclined position.

6. In combination with a whiffletree body, a pair of openwork end casings permanently inclined toward each other, each of which is reduced to a single bar in its inner part that fits against the rear of said body, means for detachably fastening said casings to said body through said bars, springs carried by said casings, and means for applying to said springs the pull of a pair of draft chains.

7. In combination with the whiffletree body, a pair of end casings, each of which consists of two sockets and is provided at or near the junction of said sockets with a stop to prevent the proximate end of the whiffletree from passing too far into said casing, springs located in said casings and means for applying to said springs the pull of a pair of draft chains.

8. In combination with a whiffletree body, a pair of split rings, each provided with perforated lugs at the point of division and with an additional pair of lugs diametrically opposite the same, in combination with rivets passing through the first pair of lugs, a pivot passing through the other pair of lugs of one of said rings, a U-shaped clevis hook mounted at one end on said pivot, and provided at the other end with an eye adapted to enter between the corresponding pair of lugs of the other ring, and a detachable split pin adapted to pass through said eye and through the pair of lugs between which it is located.

9. In combination with a whiffletree body, a pair of split rings, means for clamping them on said body, a clevis hook pivoted to one of said rings, and means for detachably engaging said hook with the other split ring, the points of division of said rings being distinct from the points of attachment of said clevis hook.

10. In combination with a whiffletree body, a pair of split rings, means for clamping them on said body, a clevis hook pivoted to one of said rings and means for detachably engaging said hook with the other split ring at will, the said clevis hook being on the opposite side of the circumference of said rings from their line of division.

11. In combination with a whiffletree body, a pair of split rings provided with lugs for attaching the clevis hook, means for clamping them on said body, a clevis hook pivoted at one end to the lugs of one of said rings and means for detachably fastening at will the other end of said hook to the lugs of the other split ring, the said lugs being at different points of the circumference of said split rings from their points of division, substantially as set forth.

In testimony whereof, I have signed my name to this specification in the presence of two subscribing witnesses.

FREEMAN R. WILLSON.

Witnesses:
JOHN K. HENRY,
STEPHEN STEPANIAN.